United States Patent
Liu et al.

(10) Patent No.: US 7,944,164 B2
(45) Date of Patent: May 17, 2011

(54) METHOD AND APPARATUS FOR IDENTIFYING ORIENTATION OF A STATIONARY ROTOR IN A SENSOR-LESS PMSM

(75) Inventors: Jingbo Liu, Grafton, WI (US); Thomas Nondahl, Wauwatosa, WI (US); Peter Schmidt, Franklin, WI (US); Semyon Royak, Beachwood, OH (US); Mark Harbaugh, Richfield, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 370 days.

(21) Appl. No.: 12/183,758

(22) Filed: Jul. 31, 2008

(65) Prior Publication Data

US 2010/0026223 A1    Feb. 4, 2010

(51) Int. Cl.
H02P 1/04    (2006.01)
(52) U.S. Cl. .......... 318/400.33; 318/701; 318/400.4
(58) Field of Classification Search .......... 318/400.33, 318/701, 400.4, 376, 400.11, 818, 400.23, 318/801; 310/49
See application file for complete search history.

(56) References Cited

U.S. PATENT DOCUMENTS

| | | | |
|---|---|---|---|
| 5,917,257 A * | 6/1999 | Taghezout | 310/49.51 |
| 6,636,012 B2 | 10/2003 | Royak et al. | |
| 6,984,958 B2 | 1/2006 | Niiranen | |
| 7,262,577 B2 | 8/2007 | Heikkila et al. | |

OTHER PUBLICATIONS

Nahid-Mobarakeh, Babak, et al., Mechanical Sensorless Control of PMSM with Online Estimation of Sator Resistance, IEEE Transactions on Industry Applications, vol. 40, No. 2, Mar./Apr. 2004, pp. 457-471, IEEE, New York, New York, USA.
Morimoto, Shiego, et al., Mechanical Sensorless Drives of IPMSM with Online Parameter Identification, IEEE Transactions on Industry Applications, vol. 42, No. 5, Sep./Oct. 2006, pp. 1241-1248, IEEE, New York, New York, USA.
Silva, César, et al., Hybrid Rotor Position Observer for Wide Speed-Range Sensorless PM Motor Drives Including Zero Speed, IEEE Transactions on Industrial Electronics, vol. 53, No. 2, Apr. 2006, pp. 373-378, IEEE, New York, New York, USA.
Aihara, Takashi, et al., Sensorless Torque Control of Salient-Pole Synchronous Motor at Zero-Speed Operation, IEEE Transactions on Power Electronics, vol. 14, No. 1, Jan. 1999, pp. 202-208, IEEE, New York, New York, USA.
Kim, Hyunbae, et al., Improved Current Regulators for IPM Machine Drives Using On-Line Parameter Estimation, Conf. Rec. IEEE IAS Annual Meeting, 2002, pp. 86-91, Pittsburgh, PA.
Noguchi, Toshihiko, et al., Initial Rotor Position Estimation Method of Sensorless PM Synchronous Motor with No Sensitivity to Armature Resistance, IEEE Transactions on Industrial Electronics, vol. 45, No. 1, Feb. 1998, IEEE, New York, New York, USA.
Kim, Hyunbae, et al., Using On-Line Parameter Estimation to Improve Efficiency of IPM Machine Drives, Proc. of the IEEE PESC Conference, Jun. 23-27, 2002, pp. 815-820, Queensland, Australia.

(Continued)

*Primary Examiner* — Karen Masih
(74) *Attorney, Agent, or Firm* — Boyle Fredrickson LLP; Alexander R. Kuszewski; John M. Miller (57) ABSTRACT

A method and apparatus for determining rotor position in a stationary rotor of a sensor-less permanent magnet synchronous machine that employs a rotating magnetic field to identify a magnetic axis of the stator without a magnetic direction and then determines magnetic direction by applying pulses along the magnet axis in two polarities.

14 Claims, 5 Drawing Sheets

OTHER PUBLICATIONS

Hu, Jiangang, et al., Eddy Current Effects on Rotor Position Estimation for Sensorless Control of PM Synchronous Machine, Proceedings of IEEE Industry Applications Conference, Oct. 8-12, 2006, pp. 2034-2039, Tampa, Florida, USA.

Jahns, Thomas M., et al., Interior Permanent-Magnet Synchronous Motors for Adjustable-Speed Drives, IEEE Transactions on Industry Applications, vol. IA-22, No. 4, Jul./Aug. 1986, pp. 738-747, IEEE, New York, New York, USA.

* cited by examiner

METHOD AND APPARATUS FOR IDENTIFYING ORIENTATION OF A STATIONARY ROTOR IN A SENSOR-LESS PMSM

CROSS-REFERENCE TO RELATED APPLICATIONS

—

STATEMENT REGARDING FEDERALLY SPONSORED RESEARCH OR DEVELOPMENT

—

BACKGROUND OF THE INVENTION

The present invention relates to electric motors and in particular to permanent magnet synchronous machines (PMSM) and more particularly to a method and apparatus for determining the starting position of the rotor of a PMSM without a position sensor such as a resolver.

Permanent magnet synchronous machines are electric motors having a rotor holding a permanent magnet that may turn about an axis within a stator. The stator holds conductive coils that may be energized to create a rotating magnetic field. The rotating magnetic field is coordinated with the rotor position to draw the rotor along synchronously.

Simple PMSM's employ power transistors to switch the electrical currents in the stator coils to create the necessary rotating magnetic field. "Sensor-less" PMSM's eliminate the rotor position sensors and deduce rotor position from its effect on the electrical signals used to drive the stator coils.

In these sensor-less PMSM's, rotor position may be simply determined while the motor is operating (and the rotor is spinning) by means of the electrical voltages generated (induced) by the rotating magnetic rotor in the stator windings (so called "back-EMF"). Unfortunately, when the rotor is moving at a low speed or stationary, the back-EMF is low or nonexistent making it difficult to determine rotor position. Starting a PMSM motor without knowing the rotor position causes sudden accelerations of the rotor (possibly in the wrong direction) as the rotor attempts to align itself with the generated field. In many important motor control applications, such abrupt and unpredictable motion is undesirable.

To overcome this problem, an approach has been developed for identifying rotor position that does not rely on back-EMF and thus that can work for a stationary rotor. This approach relies on variations in magnetic saliency of the rotor. Magnetic saliency refers to a change in the inductance of the stator windings as a function of the orientation of the rotor and results generally from the anisotropic magnetic properties of the rotor.

A typical approach to identifying rotor position using magnetic saliency is described in U.S. Pat. No. 6,172,498 in which pulses are applied to each of the stator windings in sequence and variations in measured saliency is used to deduce the approximate location of the rotor.

One limitation to this approach is that special hardware may be required.

SUMMARY OF THE INVENTION

The present invention employs saliency techniques to identify the orientation of the rotor. The rotational speed of the field used to deduce saliency is set high enough so as to avoid rotor movement. After the orientation of this axis is determined, additional pulses can be applied along the magnetic axis also without promoting rotor movement. By applying positive and negative pulses along the magnetic axis, rotor magnetic direction is revealed by slight differences in induction caused by changes in saturation of surrounding magnetic components. In this way, absolute rotor position (magnetic axis and magnetic direction) may be determined.

Specifically then, the present invention provides a method of determining rotor position in a PMSM having a permanent magnet rotor having magnetic direction, the permanent magnet rotor rotatable within stator coils receiving an electric signal to generate a stator field. In a first period, the method applies a first electrical signal to the stator coils to create a rotating stator field having a high rotational speed with a strength insufficient to cause a movement of the rotor. Current flow through the stator during this first period is used to detect a current fluctuation caused by anisotropic saliency of the permanent magnet rotor to deduce the magnetic axis. Next, in a second period after the first period, a second electrical signal is applied to the stator coils to produce a magnetic field aligned with the magnetic axis to prevent rotor motion, and current flow through this stator during the second period is used to deduce the magnetic direction and thus the orientation of the rotor.

Thus it is an object of at least one embodiment of the invention to provide an unambiguous identification of rotor position without substantial rotor movement.

The second electrical signal may include a first voltage pulse of a first polarity aligned with the axis of magnetic direction and a second voltage pulse of a second polarity aligned with the axis of magnetic direction and a magnitude of current flow through the stator during the first and second stator voltage pulses may be compared to deduce the magnet direction.

It is thus an object of at least one embodiment of the invention to identify direction of magnetization along the stator axis by variations in electrical response of the stator to opposed magnetic fields caused by opposed voltage pulses.

The first and second stator field pulses may each be followed with an equal energy current suppression pulse of opposite polarity.

It is thus an object of at least one embodiment of the invention to provide extremely rapid assessment of rotor position with minimal rotor motion.

The lesser magnitude of current flow may indicate alignment between the polarity of the pulse and the magnetic direction.

It is thus an object of at least one embodiment of the invention to make use of saturation effects in ferromagnetic components to deduce the direction of the magnetic field of the rotor.

The invention may further include the step of, in a third period, controlling a startup of the motor based on the deduced orientation of the rotor.

It is thus an object of at least one embodiment of the invention to provide an improved method of starting a PMSM.

The invention may include the further step of applying a third electrical signal to the stator coils, during the third period, to cause movement of the rotor according to a command signal, and further applying the first electrical signal to the stator coils having a substantially higher frequency than the third electrical signal during the third period, and further monitoring the current flow through the stator caused by the first electrical signal to update the rotor position.

It is thus an object of at least one embodiment of the invention to provide for sensor-less operation of the motor using the ambiguous saliency information as initialized by the present invention's determination of magnet direction.

It is thus an object of at least one embodiment of the invention to provide a simple yet high-resolution method of determining rotor axis independent of the number of stator poles.

These particular objects and advantages may apply to only some embodiments falling within the claims and thus do not define the scope of the invention.

DETAILED DESCRIPTION OF THE PREFERRED EMBODIMENT

Figure 1:
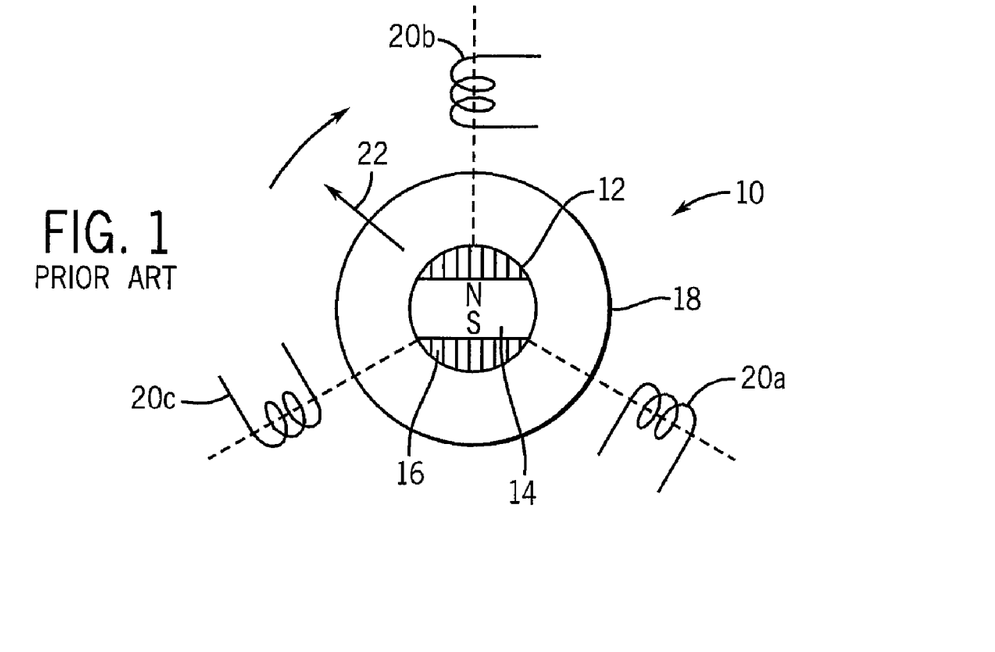
FIG. 1 is a simplified cross-sectional view through a single pole pair permanent magnet synchronous machine of the type suitable for use with the present invention.

Referring now to FIG. 1, a PMSM motor 10 provides a rotor 12 attached to a rotatable shaft (not shown) for rotation about an axis through the center of the rotor 12 perpendicular to the plane of the figure. The rotor 12 includes a permanent magnet 14 and ferromagnetic flux directors 16. For clarity, a rotor having a single pole pair (e.g. only a single north and south pole) is shown; however, it will be understood that the present invention is equally applicable to multi-pole rotors.

The rotor 12 may be surrounded by a stator 18 having one or more coils 20a, 20b, and 20c shown here positioned at regular angles of 120° about the rotor 12. Again additional coils may be provided according to techniques well known in the art for motors having larger numbers of poles.

Generally, appropriately phased signals may be applied to each of coils 20a, 20b and 20c to produce a rotating magnetic field vector 22 synchronously attracting the rotor 12 to drive the motor 10.

Figure 2:
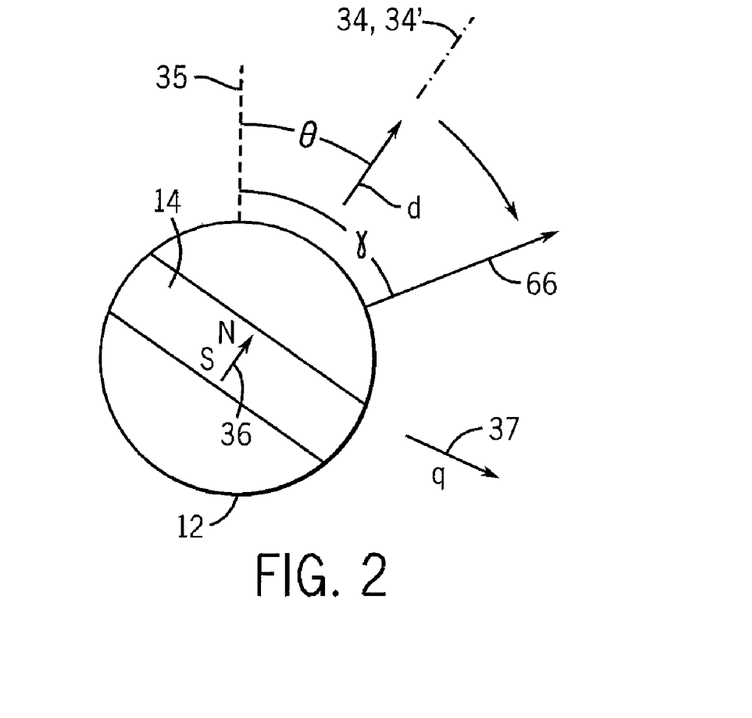
FIG. 2 is an enlarged view of the rotor of FIG. 1 showing various axes and a rotating magnetic field described in the specification.

Referring now to FIG. 2, the permanent magnet 14 of the rotor 12 has a magnetic vector defined by the north pole and one south pole of the permanent magnet 14 and defining both a magnetic axis 34 and a magnet direction 36, (the latter having a direction, from south to north). A d-axis 34' of the rotor 12 is aligned with the magnetic axis 34 and a q-axis 37 of the rotor is perpendicular to the magnetic axis 34. The magnetic axis 34 and magnet direction 36 also define a rotor angular position θ measured between an arbitrary stationary reference point and the d-axis.

Figure 3:
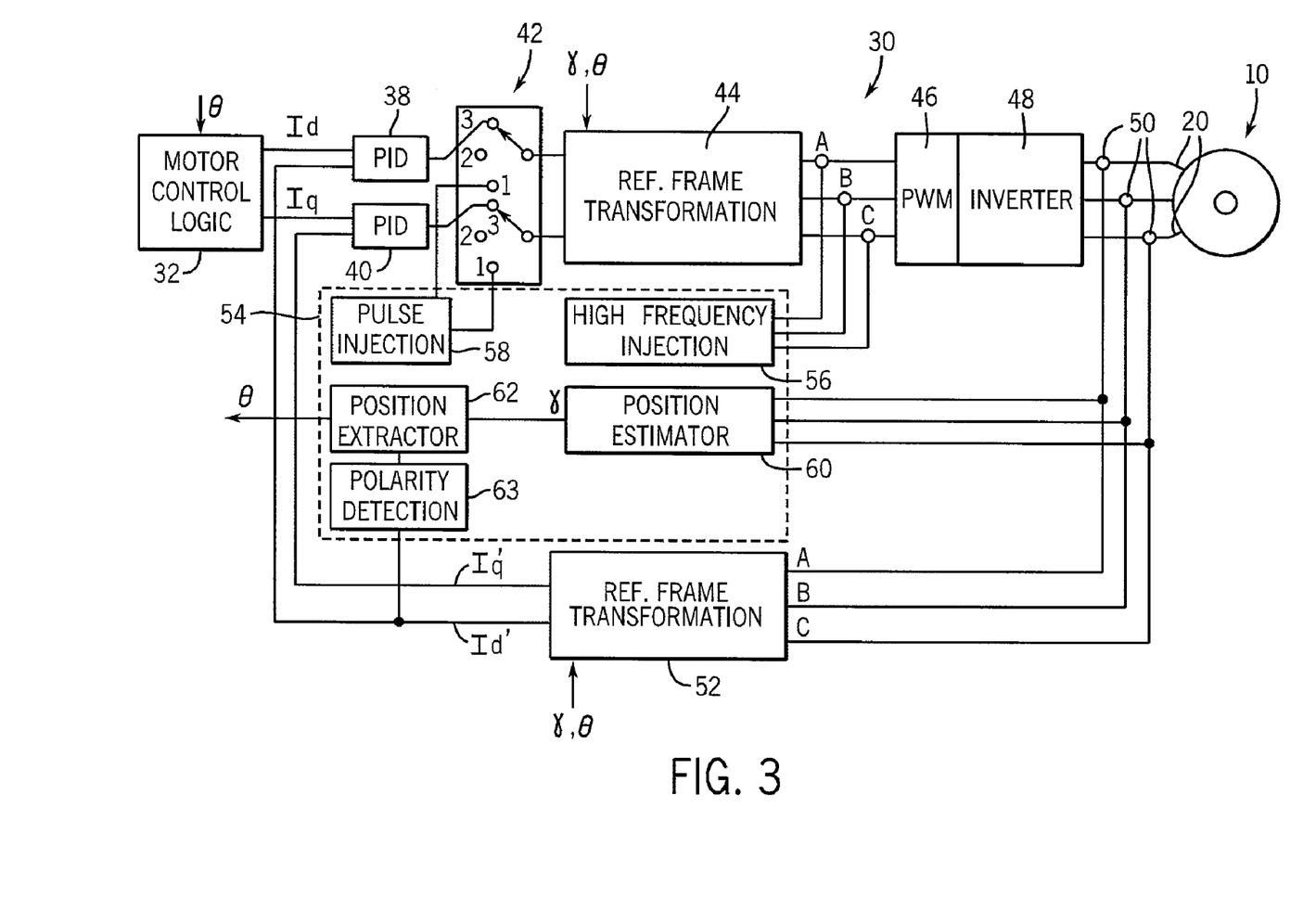
FIG. 3 is a block diagram of an electronic drive for the motor of FIG. 1 such as may incorporate the present invention.

Referring now to FIG. 3, a motor drive 30 suitable for practicing the present invention may receive command signals at motor control logic 32, for example position and velocity or acceleration commands, and may interpret these commands into a q and d current Iq and Id respectively. As is understood in the art, these currents define stator currents that will produce magnetic fields in the q-axis and d-axis directions respectively. In order to effect acceleration and speed control, the motor control logic 32 must receive an indication of rotor position θ.

The Iq and Id currents are received by PID controllers (proportional, integral, derivative controllers) or other similar feedback control circuits 40 and 38 respectively, which provide voltage commands Vq and Vd to null the error signals for the Iq and Id currents respectively.

The error signals may be received by one pole (3) of a single pole, triple throw switch pair 42, which during normal operation, is connected to a vector rotator 44 which, using knowledge of θ (during normal operation), converts the Vd and Vq voltage commands to A, B and C voltages corresponding to coils 20a, 20b and 20c described above and more generally to three phases of power provided to the motor 10. The present invention, in which θ is initially unknown, substitutes a generated value of γ to produce the desired test waveforms to be described.

These A, B and C voltage commands are received by a pulse width modulator 46 which provides pulse width modulated signals to an inverter 48 which in turn provides high power current to the coils 20 and thus to the motor 10 regulating the A, B and C currents.

The current on coils 20 is monitored by current sensors 50 and provided to a vector de-rotator 52 performing the opposite function of vector rotator 44 in converting signals A, B and C into feedback currents I'd and I'q respectively. These feedback currents I'd and I'q are in turn provided to the feedback control circuits 38 and 40 to complete a feedback control loop as is understood in the art.

The present invention augments this motor drive 30 through the addition of five blocks that form a position detection system 54. The first block is a high-frequency injector 56 which may add a signal on top of the power provided to the motor 10 producing a high-frequency, low-power rotating magnetic field as will be described. In one embodiment, as shown, the signal from the high-frequency injector 56 is added to the A, B and C voltages after the vector rotator 44; however, it could also be added, with the appropriate transform, to the voltage commands Vα and Vβ, to similar effect.

The second block of the position detection system 54 is a pulse injector 58 which is connected one pole (1) of pair switch 42 to be connected to the input of vector rotator 44 during a second stage of motor control before the rotor 12 is rotating.

A third block of the position detection system 54 is a rotor position estimator 60 receiving the signals taken at taps 50 during application of the high-frequency from high-frequency injector 56 to determine a magnetic axis signal γ indicating the orientation of the magnetic axis 34 (without direction) as deduced from measurements of the power signals. Generally γ could either equal θ or θ+180 degrees as a result of the fundamental symmetry in saliency of the rotor 12.

A fourth block of the position detection system 54 is a magnetic direction analyzer 63 monitoring the feedback current Id during application of the pulses from the pulse injector 58 to determine magnetic direction.

Finally, the fifth block 62 is a rotor position extractor using the magnetic axis signal γ and the magnetic direction to deduce θ as will be described.

Generally the elements of the motor drive 30 will include discrete electrical components, including power semiconductors and the like as well as one or more computer processors executing stored programs to implement functional blocks described.

Figure 4:
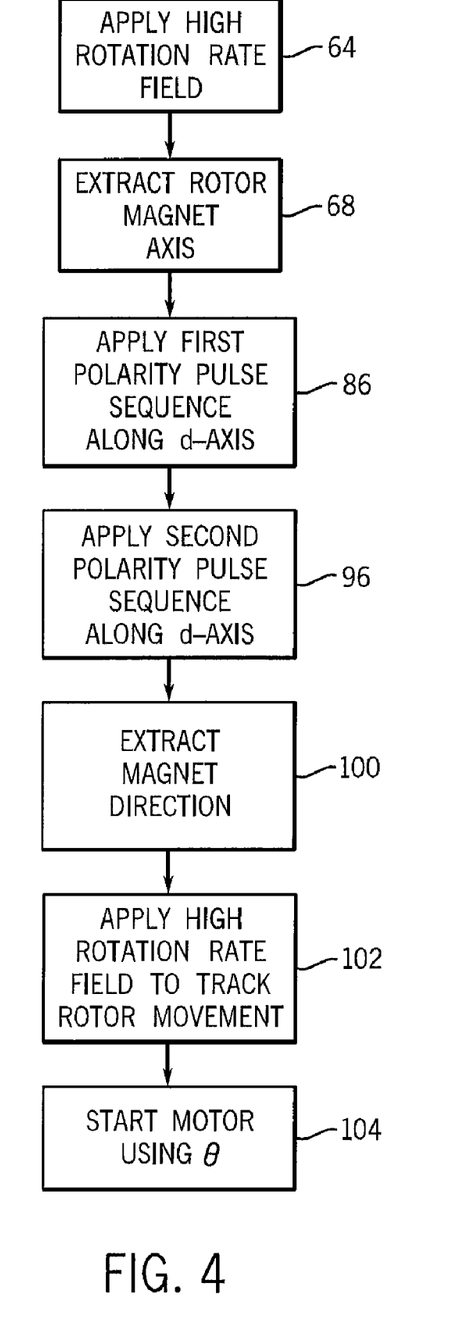
FIG. 4 is a flow chart showing the steps implemented by a program in the electronic drive of FIG. 3.

Referring now to FIG. 4, the position detection system 54 may operate according to a stored program having initial process block 64 during which a high-speed rotational vector from injector 56 is applied to the power signals received by coils 20 of motor 10 through the pulse width modulator 46 and inverter 48. At this time, the rotor 12 is stationary and switch pair 42 is connected to pole (2) disconnecting the feedback control circuits 38 and 40.

Referring momentarily to FIG. 2, this high-speed rotational vector 66 has a low-strength and high angular speed such as to not induce rotation in the rotor 12. As a practical matter, the rotor 12 experiences a slight torque from the projection of the rotational vector 66 on the q-axis, but the direction of torque changes rapidly so that the rotational inertia of the rotor 12 prevents substantial motion. Generally the speed of rotation of the vector 66 will be substantially greater than the normal rotational speed of the motor but at a frequency low enough to prevent substantial inductive attenuation.

Figure 5:
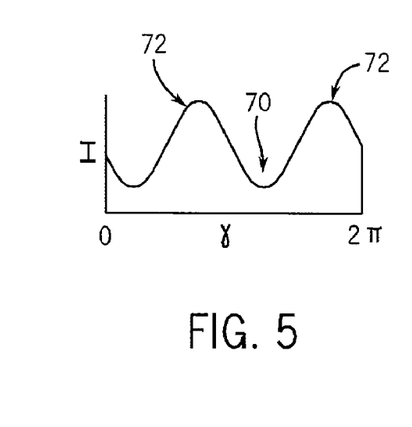
FIG. 5 is a simplified plot of saliency as a function of stator field angle showing features indicating the rotor magnetic axis.

Referring again to FIGS. 3 and 4, at process block 68, the currents at the coils 20 are monitored by the estimators 60 to determine the angle of the rotor magnetic axis 34. As shown in FIG. 5, the magnetic axis 34 can be discovered by monitoring the currents 70 of the stator 12 with respect to the vector 66 over a full motor phase cycle. A motor phase cycle will be 360° for a single pole pair motor, or 360°/N for an N-pole pair motor where generally N is the number of duplications of coils 20a-20c around the stator. The currents are analyzed to identify saliency features 72 caused by anisotropic qualities of the rotor that indicate the angle θ of the rotor. The current, for example, may be highest when vector 66 is aligned with axis 34 and so the current 72 may indicate peaks in saliency. Note generally that there will be two saliency features 72 for every motor phase cycle and so this determination of process block 68 identifies only the magnetic axis 34 (γ) and not the magnetic direction 36 (θ).

Figure 6:
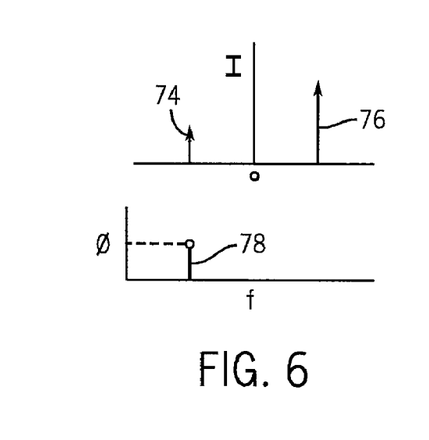
FIG. 6 is a frequency domain plot showing isolation of a high-frequency saliency signal and its phase to deduce rotor axis.

Referring to FIG. 6, generally, the angle of the magnetic axis 34 may be determined from the saliency by extracting a frequency component 74 rotating in the opposite direction of the frequency 76 of the rotating vector 66 (reflecting the symmetrical property of saliency) and identifying a phase 78 of that frequency component 74 such as indicates the angle γ.

Figure 7:
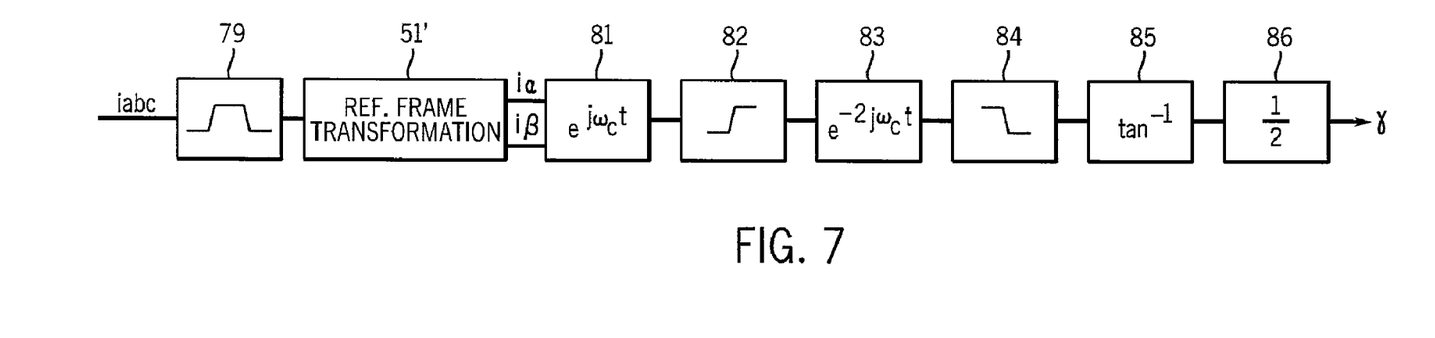
FIG. 7 is a block diagram of one method of extracting the position information of FIG. 6 that may be implemented by the position detection system of the present invention.

Referring to FIG. 7, this extraction may, in theory, be done through a series of filter blocks including a bandpass filter 79 receiving the stator currents iabc from the coils 20, followed by a vector de-rotator 51' producing quadrature signals iα and iβ. A first vector rotator 81 receives the quadrature signals and is followed by a high pass filter 82 which may be used to extract frequency component 74 which may be derotated by vector rotator 83 and smoothed by low pass filter 84 to be processed by an arc tangent circuit 85 and halving block 86 to deduce angle γ.

Referring again to FIG. 4, once the magnetic axis 34 is determined at process block 86, the magnet direction 36 is deduced by applying first and second polarity pulses along the d-axis (determined to be at angle θ). These pulses may be produced by pulse injector 58 as shown in FIG. 3 when switch pair 42 is switched to poles (1).

Figure 8:
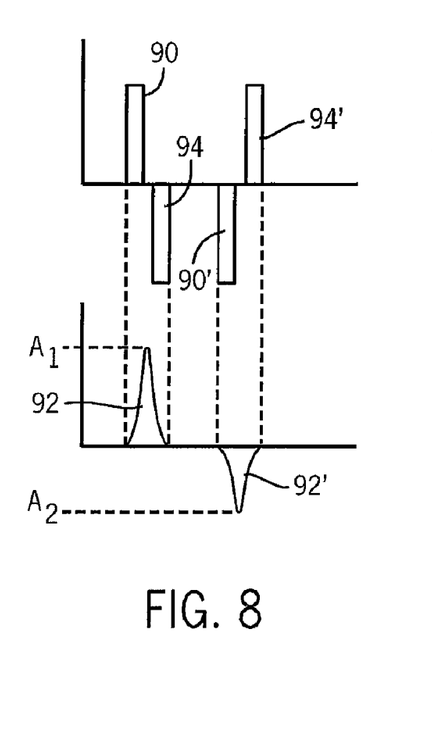
FIG. 8 is a pulse sequence used in the present invention for determination of magnetic direction once rotor axis has been determined.

Referring to FIG. 8, a first polarity voltage pulse 90 produces a current pulse 92 in the stator windings reaching an amplitude of A1 during the time of pulse 90. The pulse 90 is quickly followed by a current suppression pulse 94 of equal and opposite area to stop the current flow through the stator windings. Because the pulse 90 and current suppression pulse 94 are applied along the d-axis, little or no torque is exerted on the rotor 12. As indicated by process block 96 of FIG. 4, the first polarity pulse 90 and current suppression pulse 94 are followed by a second polarity voltage pulse 90' having opposite polarity as pulse 90 to produce a negative polarity current pulse 92' having amplitude A2. Pulse 90' is followed by current suppression pulse 94' having opposite polarity as pulse 90' to suppress the current flow through the stator winding. Generally the amplitude A1 will differ from amplitude A2 and this difference will determine the magnetic direction 36.

Figure 9:
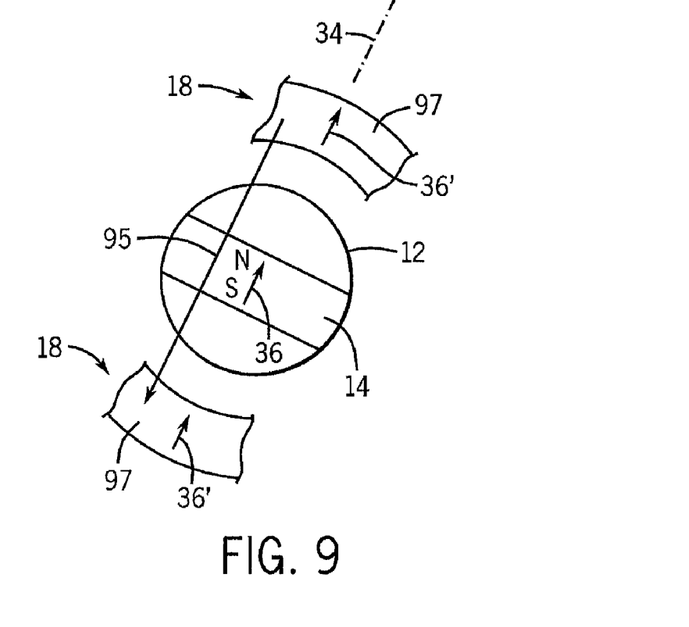
FIGS. 9 and 10 are schematic representations of the fields applied by the pulses of FIG. 8 superimposed on a fragmentary view of the rotor and stator of FIG. 1 showing the influence of magnetic saturation.
Figure 10:
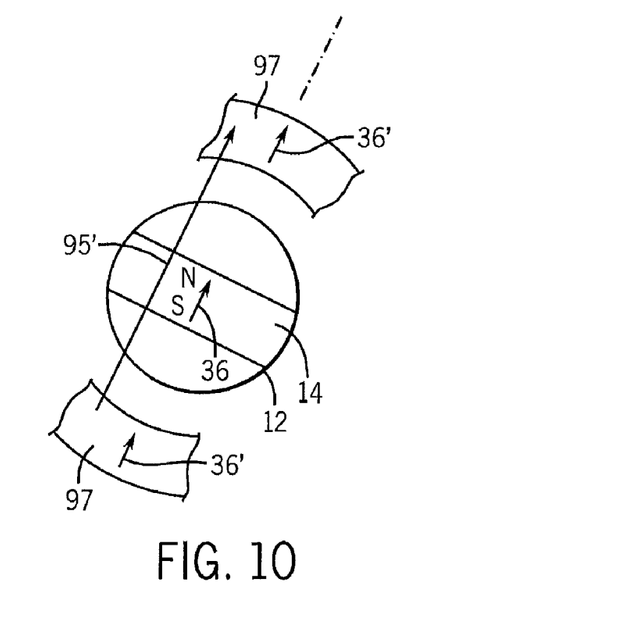

Referring to FIG. 9, with the rotor 12 in a first orientation along the rotor axis 34, the permanent magnet 14 will cause magnetization 36' in ferromagnetic elements 97 associated with the rotor 12 or stator 18. The first polarity pulse 90 may produce a magnetic vector 95 generally counter to the magnetic direction 36 and magnetization 36', depending on the position of the rotor 12. In this case, the opposite directions of the induced magnetization 36' and magnetic vector 95 will reduce saturation of these ferromagnetic elements 97 increasing the peak inductances seen by the stator coils 20 thus decreasing the height of pulse amplitude A1. In contrast, as seen in FIG. 10, the opposite polarity pulse 90' will produce a magnetic vector 95' aligned with the magnetization 36' causing deeper saturation of the ferromagnetic elements 97 decreasing the inductance and increasing the height of pulse 92'. Thus the actual magnet direction 36 may be deduced by comparing these two amplitudes A1 and A2 as indicated by process block 100.

Referring to FIG. 3, a comparison of the amplitudes A1 and A2 is performed by magnetic direction analyzer 63 to determine magnetic direction which is used by rotor position extractor 62 using the magnetic axis signal γ and the magnetic direction to provide a running determination of θ which in turn may be used by the vector rotator 44 and vector de-rotator 52 in lieu of γ during starting of the motor 10 as indicated by process block 102. Just before the motor 10 has started, as indicated by process block 104, the high-frequency signal of process block 64 is reapplied to the stator coils 20, per process block 102, and used to extract rotor magnetic axis 34 in the manner described with respect to process block 68 for ongoing sensor-less operation.

The present invention has been described in terms of the preferred embodiment, and it is recognized that equivalents, alternatives, and modifications, aside from those expressly stated, are possible and within the scope of the appending claims.

We claim:

1. A method of determining rotor position in a PMSM having a permanent magnet rotor producing a magnetic flux having a magnet direction, the permanent magnet rotor rotatable within stator coils receiving an electric signal to generate a stator field, the method comprising the steps of:
   (a) in a first period, applying a first electrical signal to the stator coils to create a rotating stator field having a rotational speed and strength insufficient to cause a movement of the rotor;

(b) monitoring current flow through the stator during (a) to detect a fluctuation in current caused by anisotropic saliency of the permanent magnet rotor to deduce a magnetization axis;
(c) in a second period after the first period, applying a second electrical signal to the stator coils to produce a magnetic field aligned with the magnetization axis to minimize rotor motion; and
(d) analyzing current flow through the stator during the second period to deduce the direction of the magnetic flux and thus an orientation of the rotor.

2. The method of claim 1 wherein the second electrical signal of step (c) includes a first pulse of a first polarity aligned with the magnetization axis and a second pulse of a second polarity aligned with the magnetization axis, and wherein step (d) compares magnitude of current flow through this stator during the first and second stator field pulses to deduce the magnetic direction of the rotor along the axis.

3. The method of claim 2 further including the step of following the first and second stator field pulses each with an equal energy current suppression pulse of opposite polarity.

4. The method of claim 2 wherein a greater magnitude of current flow indicates alignment between the polarity of the pulse and the magnetic direction.

5. The method of claim 1 further including the step of, in a third period, controlling a startup of the PMSM based on the deduced orientation of the rotor.

6. The method of claim 1 further including the step of applying a third electrical signal to the stator coil during a third period to cause movement of the rotor according to a command signal, and further applying the first electrical signal to the stator coil having a substantially higher frequency than the second electrical signal during the third period, and further monitoring the current flow through the stator caused by the first electrical signal to update the deduced rotor position.

7. The method of claim 1 wherein step (b) monitors current flow by extracting a high-frequency signal and analyzing a phase of the high-frequency signal to deduce the magnetization axis.

8. In a motor drive system having an electronic computer for providing and monitoring electrical signals communicated between the electronic computer and stator coils of a PMSM, the PMSM having a permanent magnet rotor having a magnet direction and the permanent magnet rotor rotatable within stator coils, a program executing on the electronic computer to:

(a) in a first period, apply a first electrical signal to the stator coils to create a rotating stator field having a rotational speed and strength insufficient to cause a movement of the rotor;
(b) monitor current flow through the stator during (a) to detect a fluctuation caused by anisotropic saliency of the permanent magnet rotor to deduce an axis of the magnetic direction;
(c) in a second period after the first period, apply a second electrical signal to the stator coils to produce a flux aligned with the magnetization axis to prevent rotor motion; and
(d) analyze current flow through the stator during the second electrical signal to deduce the magnetic direction and thus an orientation of the rotor.

9. The motor drive of claim 8 wherein the second electrical signal of step (c) includes a first pulse of a first polarity aligned with the magnetization axis and a second pulse of a second polarity aligned with the magnetization axis and wherein step (d) compares magnitude current flow through this stator during the first and second stator field pulses to deduce the magnetic direction of the rotor along the axis.

10. The motor drive of claim 9 wherein the greater magnitude indicates alignment between the polarity of the pulse and the magnetic direction.

11. The motor drive of claim 8 further including the step of, in a third period, controlling a startup of the motor based on the deduced orientation of the rotor.

12. The motor drive of claim 8 further including the step of applying a third electrical signal to the stator coil during a third period to cause movement of the rotor according to a command signal, and further applying the first electrical signal to the stator coil having a substantially higher frequency than the second electrical signal during the third period, and further monitoring the current flow through this stator caused by the first electrical signal to update the rotor position.

13. The motor drive of claim 8 further including the step of following the first and second stator field pulses with an equal energy current suppression pulse of opposite polarity.

14. The motor drive of claim 8 wherein step (b) monitors current flow by extracting a high-frequency signal and analyzing a phase of the high-frequency signal to deduce the magnetization axis.

* * * * *